(12) United States Patent
Aufrere et al.

(10) Patent No.: US 7,328,930 B2
(45) Date of Patent: Feb. 12, 2008

(54) AUTOMOBILE VEHICLE SEAT INCLUDING A BACKREST PIVOTING IN RELATION TO THE SEAT PAN AND WHICH CAN BE PLACED IN TABLE POSITION

(75) Inventors: Christophe Aufrere, Montlhery (FR); Pierre Bequet, Chalo Saint Mars (FR)

(73) Assignee: Faurecia Sieges d'Automobile, Nanterre (FR)

( * ) Notice: Subject to any disclaimer, the term of this patent is extended or adjusted under 35 U.S.C. 154(b) by 0 days.

(21) Appl. No.: 11/455,178

(22) Filed: Jun. 19, 2006

(65) Prior Publication Data

US 2007/0001474 A1 Jan. 4, 2007

(30) Foreign Application Priority Data

Jun. 20, 2005 (FR) .................................. 05 06244

(51) Int. Cl.
*A47B 85/04* (2006.01)
*B60N 2/32* (2006.01)

(52) U.S. Cl. ...................... 296/65.09; 248/157; 296/69; 297/125

(58) Field of Classification Search ............. 296/65.01, 296/65.05, 65.09, 65.16, 69; 248/157, 394, 248/419, 421, 424; 297/124, 125, 378.1
See application file for complete search history.

(56) References Cited

U.S. PATENT DOCUMENTS 2,195,507 A    4/1940  Best ........................... 248/394

| | | | | |
|---|---|---|---|---|
| 4,046,349 A | * | 9/1977 | MacAfee ..................... | 248/424 |
| 4,105,245 A | * | 8/1978 | Simons et al. ........... | 296/65.09 |
| 4,487,390 A | * | 12/1984 | Miyashita .................... | 248/396 |
| 4,767,156 A | * | 8/1988 | Yamada et al. ............. | 297/313 |
| 4,957,321 A | * | 9/1990 | Martin et al. ............ | 296/65.09 |
| 4,969,682 A | * | 11/1990 | Gray ....................... | 297/378.1 |
| 4,986,591 A | * | 1/1991 | Martienssen et al. .... | 296/65.09 |
| 5,022,707 A | * | 6/1991 | Beauvais et al. ........ | 297/216.2 |

(Continued)

FOREIGN PATENT DOCUMENTS

DE          4439975          5/1996

(Continued)

*Primary Examiner*—D. Glenn Dayoan
*Assistant Examiner*—Paul Chenevert
(74) *Attorney, Agent, or Firm*—Young & Thompson

(57) ABSTRACT

The seat includes a backrest (2) installed so as to pivot on the seat pan (1) and arranged to be placed in a table position where the rear wall of the backrest is maintained in horizontal position, more or less parallel to a seat support frame (3) arranged to be attached to the floor (5) of the vehicle, the seat pan (1) being itself installed on the said frame in a tiltable manner, so that it can be positioned, with a sufficient tilt angle, the rear of the seat pan being raised, so that the backrest tilted on the seat pan can be placed in the said table position. The seat pan (1) is attached to the frame (3) by a set of links (6, 7) forming, with the frame and the seat pan, a deformable quadrilateral (ABCD) such that a pivoting of the links leads to the deformation of the said quadrilateral to place the seat pan in the said sufficient tilt angle position, and locking means (10) are provided to lock the pivoting of the links in relation to the seat pan or the frame.

4 Claims, 3 Drawing Sheets

U.S. PATENT DOCUMENTS

| | | | |
|---|---|---|---|
| 5,435,624 A * | 7/1995 | Bray et al. | 297/362.11 |
| 5,570,931 A | 11/1996 | Kargilis et al. | 297/378.12 |
| 5,810,443 A | 9/1998 | Blanchard | 297/378.12 |
| 5,882,061 A * | 3/1999 | Guillouet | 296/65.05 |
| 6,382,491 B1 * | 5/2002 | Hauser et al. | 296/65.05 |
| 6,478,267 B1 * | 11/2002 | Whitman et al. | 248/157 |
| 6,827,394 B2 * | 12/2004 | Watanabe et al. | 297/15 |
| 6,997,498 B2 * | 2/2006 | Oyama | 296/65.05 |
| 7,255,384 B2 * | 8/2007 | Saberan et al. | 296/65.09 |
| 7,255,399 B2 * | 8/2007 | White et al. | 297/378.12 |
| 2003/0193205 A1 | 10/2003 | Jach et al. | 296/65.09 |
| 2005/0253439 A1 * | 11/2005 | Sasaki et al. | 297/378.1 |

FOREIGN PATENT DOCUMENTS

| | | |
|---|---|---|
| DE | 10123776 | 11/2002 |
| DE | 10131399 | 1/2003 |
| EP | 0402195 | 12/1990 |
| EP | 1604862 | 12/2005 |
| JP | 58067528 A * | 4/1983 |
| JP | 60191836 A * | 9/1985 |
| JP | 60191838 A * | 9/1985 |
| JP | 60191839 A * | 9/1985 |
| JP | 2002248980 | 9/2002 |

* cited by examiner

AUTOMOBILE VEHICLE SEAT INCLUDING A BACKREST PIVOTING IN RELATION TO THE SEAT PAN AND WHICH CAN BE PLACED IN TABLE POSITION

BACKGROUND OF THE INVENTION

The present invention relates to an automobile vehicle seat including a backrest pivoting in relation to the seat pan and which can be placed in a position typically called the "table" position where the rear of the backrest is more or less horizontal.

Current vehicle seats, whether they are placed at the front, in intermediary position (when there are three rows of seats), or at the rear, increasingly include a "table" function for the backrests. This function can be independent of the backrest tilt angle setting function or combined with it. The table function can also exist without provision for a backrest tilt comfort setting function.

Moreover, seats, especially the front seats, can include a backrest forward tilt functionality, that is a partial folding of the backrest onto the seat pan to allow, for example, easier access to the seats located behind the said seat.

In seats combining the table and backrest tilt angle setting functionalities, it is known, for example, to add to a conventional discontinuous-type setting mechanism, also called "discontinuous hinge", a possibility of placing the backrest in the "table" position and to maintain it in this position by using a conventional discontinuous hinge notching system. In solutions of this type, the pivoting of the backrest for the table function is done around the same axis as the pivoting for the tilt setting or "comfort" setting which requires that this pivoting axis be located sufficiently high to allow the backrest to be folded down onto the seat pan until the rear of the backrest is horizontal.

As such a configuration is not always suitable for technology or ergonomic reasons, it has already been proposed to achieve the pivotings required respectively for comfort and for the table function on different axes. The "comfort" setting of the backrest is then achieved around a first axis, generally located fairly low down, by means of a conventional fine adjustment mechanism such as the above-mentioned discontinuous hinge; and the pivoting of the backrest for the table function is ensured around a second axis located higher by a simpler mechanism as its aim is only to ensure the pivoting between the two utilisation positions: current and "table", and the locking in each of these two positions without the need for fine adjustment.

Such an arrangement especially offers the advantage of facilitating the placing of the backrest in table position, with the rear wall of the backrest positioned horizontally. Indeed, the said second axis can then be placed sufficiently high in relation to the seat pan so that the thickness of the seat pan cushions and the padding of the backrest do not limit the folding down of the backrest onto the seat pan.

A disadvantage is that the hinge enabling the table function, even if it is simplified, necessarily creates an increase in size at a relatively high level on the sides of the backrest and this can be incompatible with the arrangement on these sides of elements which must be placed fairly low down such as, for example, certain inflatable airbags, integrated into the sides of the backrest.

Also, such an arrangement complicates the layout and the making of elements ensuring the link between the seat pan and the backrest which must provide two offset pivoting axes with the respective locking means.

Document DE-10123776 shows a system in which the seat pan is installed on links forming, with the seat pan and a base attached to the floor, a deformable parallelogram allowing the seat pan to be moved forwards and downwards by deformation of this parallelogram. Also, the backrest is hinged in relation to this base by means of another complex link system arranged to move the backrest both upwards and pivot it forwards so that it can be folded down onto the seat pan moved forward. The combination of moving the seat pan forwards and moving the backrest hinge upwards allows the backrest to be folded down with its rear face more or less horizontal. This device is however complex due to the fact that two link systems are required for the respective movements of the seat pan and the backrest.

Document JP-2002/248980 shows another system which tends to solve the problem mentioned above, with a single axis for the pivoting of the backrest in relation to the seat pan, this axis being located in a low position and overcoming the problems limiting the folding down of the backrest due to the overall size of the seat cushions and paddings. This system, to allow the rear of the backrest to be placed in horizontal position, when the seat pan cushion limits the pivoting of the backrest, allows the seat pan itself to pivot around an axis located towards the front of the seat pan which allows the rear of the seat pan to be raised and therefore the seat pan to be placed in a tilted position thus allowing the rear wall of the backrest to be placed in a horizontal position. In other words, the insufficient movement authorised at the level of the hinge between the backrest and the seat pan is compensated for by the pivoting of the seat pan itself with respect to the vehicle floor. The rear of the seat pan is maintained in raised position by a torque link-configured system, maintained in deployed position by a spring, for the table function of the backrest, and maintained in the folded position, for current use of the seat, by a lock.

This system allows therefore the backrest to be placed in horizontal position, the modification of the tilt angle of the seat pan providing the additional pivoting angle required. This system does not allow the seat pan to be maintained in a position other than the two extreme positions mentioned above. Furthermore, the height of the front of the seat pan is conditioned by the pivoting axis of the seat pan. It therefore cannot be used to ensure a seat pan tilt angle adjustment for example to ensure better comfort for the user.

SUMMARY OF THE INVENTION

The aim of the present invention is to provide a new solution to the problems mentioned above, relevant to the need encountered not to increase overall size at the sides of the backrest, by proposing a system which allows the backrest to be placed in a horizontal position, in table position, even when the tilt angle of the backrest towards the seat pan and in relation to it is limited by specific configurations of the backrest, of the seat pan and/or of their relative hinging movements.

Its aim is thus, especially for passenger side front seats, to allow the backrest to be placed in table position whilst locating the pivoting axis of the backrest in a position as low as possible to allow, in current use, the backrest assembly to be tilted towards the front and thus, for example, to free the maximum of space behind the seat for better accessibility to the rear seats.

Its aim is also to allow the backrest to be placed in table position while locating the pivoting axis of the backrest in a position as low as possible, in relation to the backrest, to allow the placing in the sides of the backrest of chest-pelvis type airbags which are relatively long and necessarily extend fairly low down in the backrest.

Its aim is also to complementarily and simply ensure, in current use of the seat, an adjustment of the tilt angle of the complete seat, to improve comfort, especially by allowing the seat to be placed in "relaxation" position, globally tilted towards the rear.

With these targets in mind, the subject of the invention is an automobile vehicle seat including a backrest installed so as to pivot on the seat pan and arranged to be placed in a table position where the rear wall of the backrest is maintained in horizontal position, more or less parallel to a seat support frame arranged to be attached to the floor of the vehicle, the seat pan being itself installed on the said frame in a tiltable manner so that it can be positioned with a sufficient tilt angle, the rear of the seat pan being raised, so that the backrest tilted on the seat pan can be placed in the said table position or in a required tilt position.

According to the invention, the seat is characterised in that the seat pan is attached to the frame by a set of links forming two opposite sides of a deformable quadrilateral the two other sides of which are respectively formed by the frame and the seat pan and such that a pivoting of the links causes the said quadrilateral to be deformed so as to place the seat pan in the sufficiently tilted position and locking means are provided to lock the pivoting links in relation to the seat pan or the frame.

According to a specific arrangement, the links are arranged so that the seat pan can also be positioned in one or more relaxation positions, the rear of the seat pan being then lowered, and locking means allowing the links to be locked in each of the said relaxation positions.

Thus, by the deformation of the deformable quadrilateral, the seat pan can be placed in various tilted positions:

in a basic position, or several neighbouring positions, the seat pan being in a position slightly titled rearwards and downwards corresponding to a current utilisation position of the seat by a passenger, in a position substantially tilted downwards and forwards, this tilt angle allowing the backrest, then folded down onto the seat pan, to be placed in table position, and, complementarily, in one or more positions where the seat pan is more titled rearwards and downwards than in the basic position, the backrest being tilted in relation to the seat pan according to the user's wishes, the seat being in a relaxation position.

The seat pan can be locked in each of these positions, preferably by locking means preventing the pivoting of the links, and the tilt angle of the backrest remains moreover adjustable in relation to the seat pan in the various comfort positions, in a known manner.

Although the pivoting movements of the backrest in relation to the seat pan and of the seat pan in relation to the floor can be independent, a connection could also be ensured so that, for example, when the tilting of the backrest on the seat pan reaches a stop, this automatically causes the unlocking of the seat pan to allow it to pivot towards its tilted position allowing the backrest to be placed in "table" position.

The invention will be more readily understood on reading the following description of an embodiment example of a seat in compliance with the invention and its implementation.

BRIEF DESCRIPTION OF THE DRAWINGS

The description refers to the accompanying drawings in which.

DESCRIPTION OF THE PREFERRED EMBODIMENTS

Figure 1:
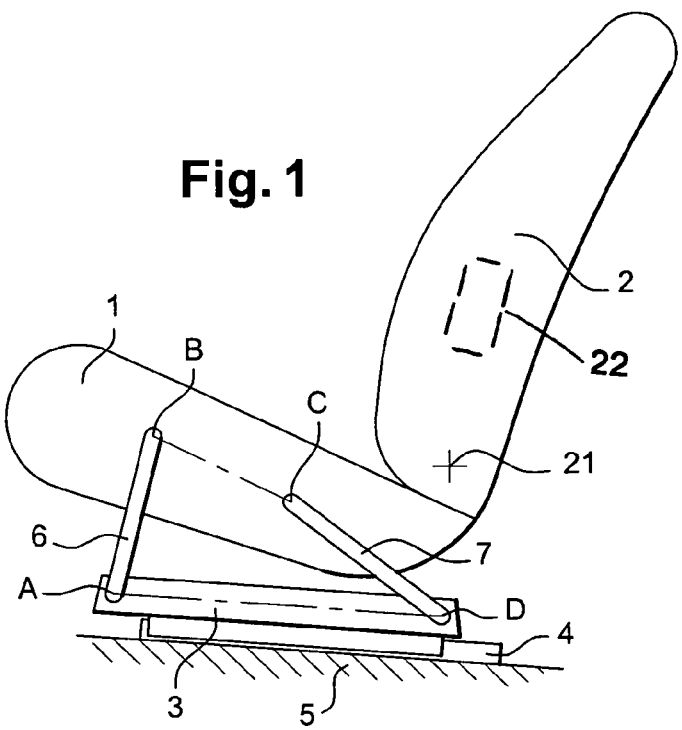
FIG. 1 is a schematic view of the seat in its current utilisation position.

The seat shown on the various figures includes a seat pan 1 on which the backrest 2 is installed hinged around the pivoting axis 21, located almost at the bottom of the backrest, so as to leave space free on the side of the backrest, above this axis 21, to house airbags or other seat equipment. The control of the pivoting of the backrest is done in a known manner, for example by a hinge mechanism of known type, which moreover includes means for locking the backrest in position in relation to the seat pan. The seat can optionally include a backrest pivoting memory system allowing, for example, the tilt of backrest to be automatically placed in the current utilisation or optimal comfort position of the seat.

The seat pan 1 of the seat is installed on a frame 3, itself installed on a set of slides 4 attached to the floor 5 of the vehicle to, in a conventional manner, ensure the adjustment of the longitudinal position of the seat.

The connection of the seat pan 1 with the frame 3 is ensured by a set of links which includes:

front links 6, hinged at A on the frame and at B on the seat pan, and rear links 7, hinged at D on the frame and at C on the seat pan, so as to form, with the seat pan and the frame, a deformable quadrilateral ABCD which can be locked by locking means which will be described later.

Typically, the distance BC is less than the distance AD so that this quadrilateral is in the form of a trapezium when line BC is parallel to AD, the directions of links 6 and 7 being convergent above line BC. This arrangement, combined with a predetermined length of the links (the length of the front and rear links being more or less equal in the example shown), allows the seat pan to be moved in relation to the frame along a curved trajectory, as can be clearly seen on FIGS. 1 to 6, the tilt angle of the seat pan varying, simultaneously with a longitudinal movement, according to the tilt angles of links 6 and 7.

Figure 5:
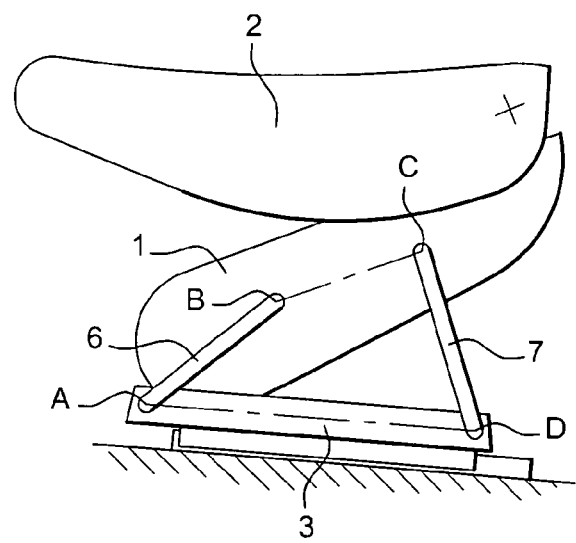

These variations in the tilt angle of the seat pan allow the position of the seat to be adjusted according to needs and, in particular, to place it in the tilt angle shown on FIG. 5 allowing the backrest to be placed in "table" position.

Figure 2:
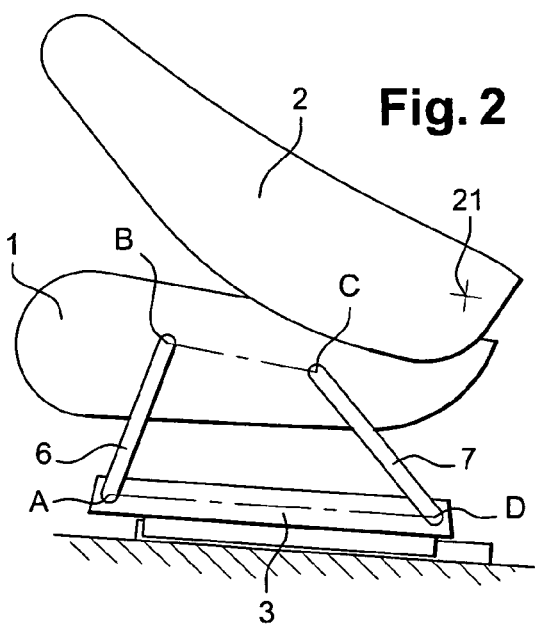
FIGS. 2 to 5 show the succession of positions up to the table position.
Figure 3:
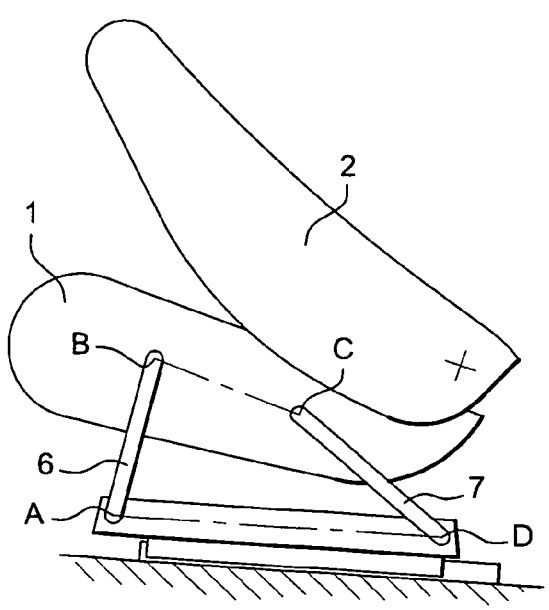
Figure 4:
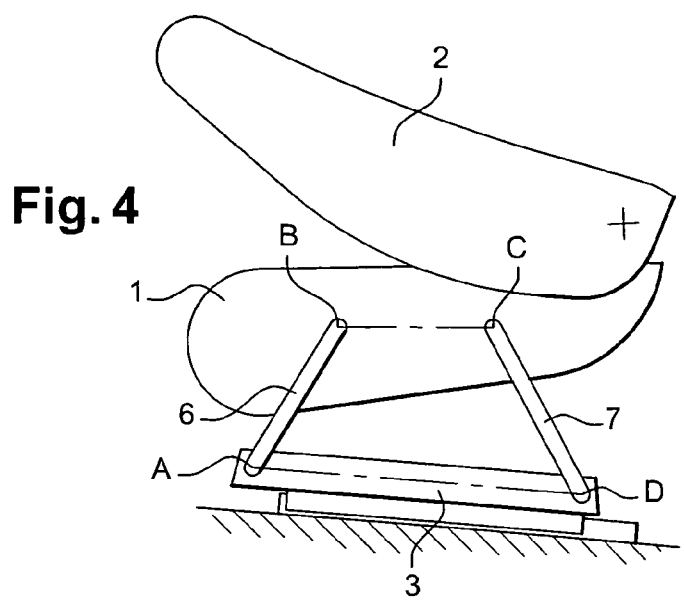

For this, starting from the current utilisation position of FIG. 1, the backrest is first of all tilted to a maximum onto the seat pan, as shown on FIG. 2, where it can be locked in position. It can be seen that, especially on account of the lateral paddings of the backrest which interfere with the padding of the seat pan, and because the pivoting axis 21 of the backrest is low, to allow, for example, chest-pelvis type airbags 22 to be placed in the sides of the backrest, the pivoting of the backrest is limited and the rear wall of the backrest remains tilted by a significant degree, far from the horizontal position corresponding to the table position.

To reach this position, it is then sufficient to unlock the links which can be done optionally by coupling with the locking of the backrest in pivoting stop position in relation to the seat pan. This then allows the pivoting of the links. The rear of the seat can then be raised, or the top of the backrest pushed forward, causing a tilting movement of the seat as a whole, according to kinematics imposed by the dimensions of the deformable quadrilateral ABCD and the positioning of the links 6 and 7 as can be seen on FIGS. 3 and 4. The backrest thus approaches the horizontal position to reach the table position shown on FIG. 5 where the links can again be locked, the front links 6 being in a maximum tilt angle position in relation to the vertical and the rear links 7 being in a minimum tilt angle position in relation to the vertical.

Return to the current utilisation position will be done by working back through the operations in reverse order after unlocking the links.

Figure 6:
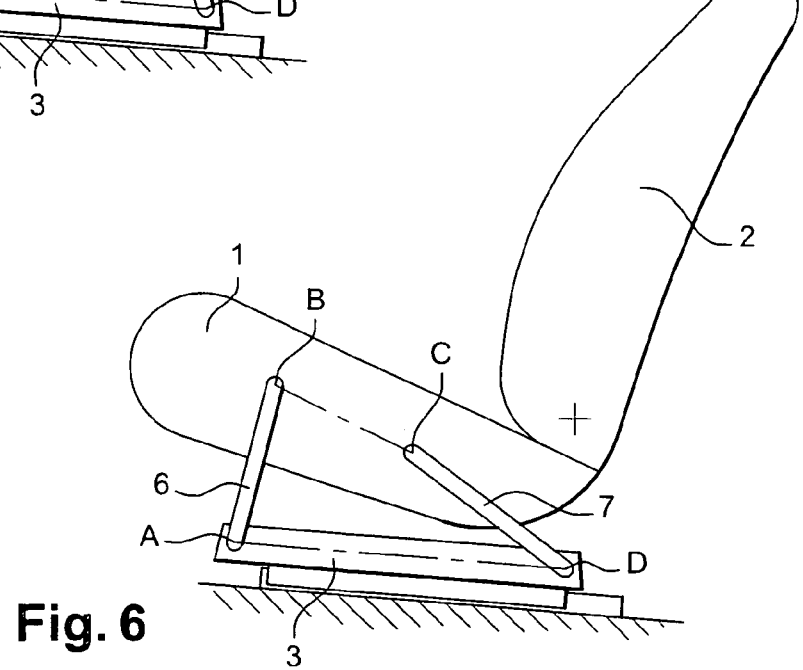
FIG. 6 shows the seat in a relaxation position.

Moreover, also starting from the current utilisation position of FIG. 1, the seat as a whole can be tilted towards the rear after unlocking the links and by deformation of the deformable quadrilateral ABCD to place it in a relaxation position shown on FIG. 6 where the front links 6 are in a minimum tilt angle position in relation to the vertical and the rear links 7 are in a maximum tilt angle position in relation to the vertical.

To facilitate change from one tilt angle position to another, the seat can be equipped with balancing means such as, for example, damper cylinders connecting the seat pan to the frame.

Figure 7:
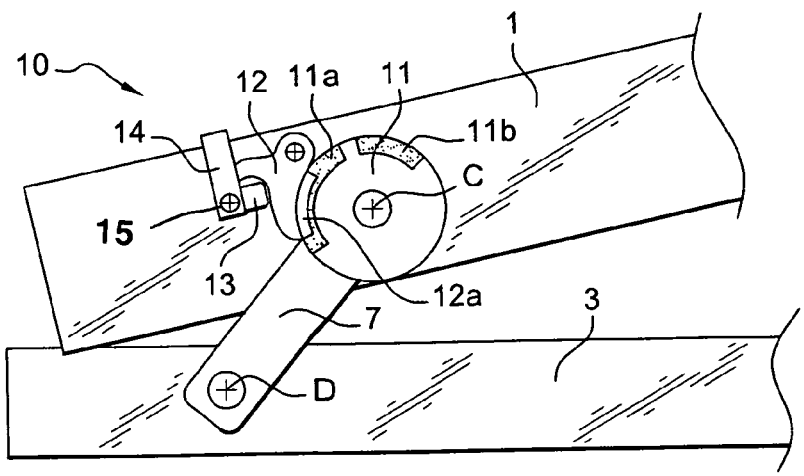
FIG. 7 is a schematic view of a locking system in a relaxation position.
Figure 8:
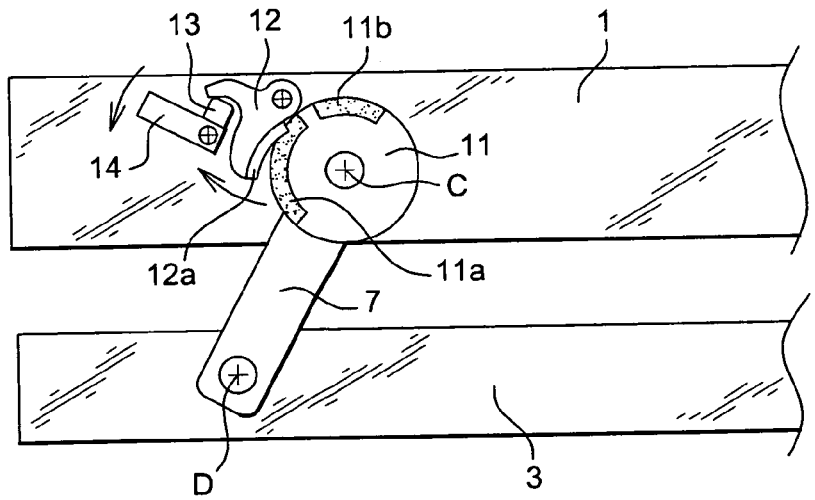
FIG. 8 shows the locking system in unlocked position.
Figure 9:
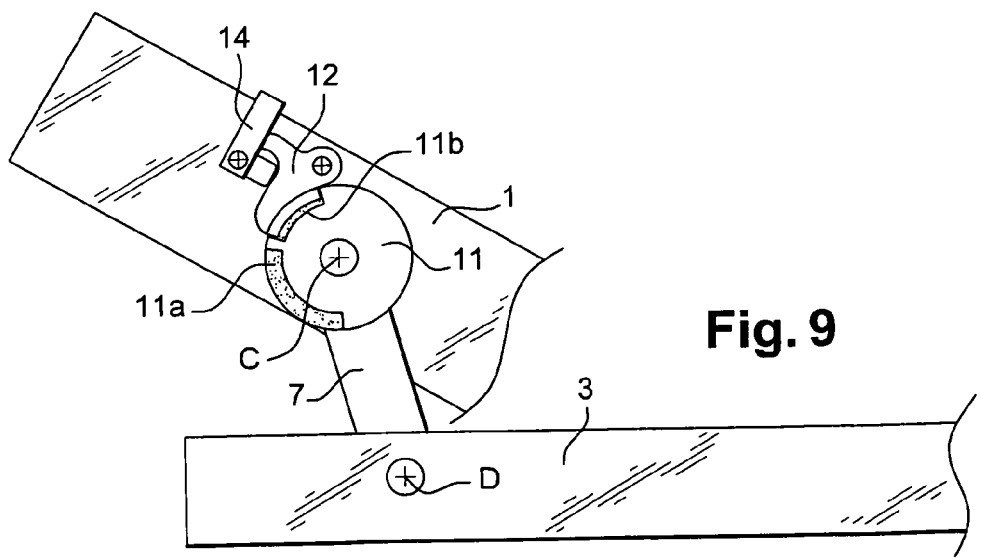
FIG. 9 shows the locking system in locked position in backrest table position.

Locking means 10, such as the locking system shown schematically on FIGS. 7 to 9, allow the pivoting of the links to be blocked in relation to the seat pan, or the frame, in the various positions required. On FIGS. 7 to 9, the front of the seat is located on the right of the figures.

These locking means include, for example, a partially toothed disc 11 attached in rotation to a rear link 7. A toothed plate 12 is installed so as to pivot on a flange of the framework of seat pan 1 and the plate is held in locked position by a cam 13 also installed so as to pivot on the said framework and controlled by a lever 14. A spring, not shown, for example a spiral spring installed on the cam pivoting shaft 15, returns the cam and holds it in locked position as shown on FIG. 7.

In the locked position shown on FIG. 7, where the seat pan is tilted to a comfort or relaxation position corresponding to the one shown on FIG. 6, the teeth 12a of the plate 12 are engaged with the teeth of a first toothed zone 11a which extends along an arc longer than that of the teeth of the plate so that locking can be achieved in several tilt angle positions of link 7 after unlocking as shown on FIG. 8. This arrangement allows the seat pan to be locked in current utilisation position and also in one or more other comfort or relaxation positions, the plate then being always engaged with the teeth of the toothed zone 11a.

In the position shown on FIG. 9, which corresponds to the maximum tilt angle position of the seat pan for placing the backrest in table position, the plate 12 engages with a second toothed zone 11b the length of which is exactly equal to the toothed zone of the plate thus achieving locking in the only position possible ensuring the horizontal orientation of the backrest.

The locking means are however not limited to those described above only as an example. Locking can also be achieved, especially in table position, by means ensuring direct locking of the seat pan in relation to the frame.

It is also to be noted that, although the aim of the invention is in particular the placing of the backrest of the seat in table position where the wall of the backrest is more or less parallel to the floor of the vehicle, the arrangement according to the invention can also be adapted so that the backrest will not be precisely in this table position but in a neighbouring position with a certain predefined tilt angle for specifically required applications.

The invention claimed is:

1. Automobile vehicle seat comprising:
a backrest (2) installed so as to pivot on a seat pan (1) and arranged to be placed in a table position where the rear wall of the backrest is maintained horizontal more or less parallel to a seat support frame (3) arranged to be attached to the floor (5) of the vehicle,
the seat pan (1) being installed in a tiltable manner on said frame so that the seat pan can be positioned with a first tilt angle where the rear of the seat pan is raised to place the backrest, tilted on the seat pan, in the table position,
the seat pan (1) being connected to the frame (3) by a set of links (6, 7) forming two opposite sides of a deformable quadrilateral (ABCD) the two other sides of which are formed respectively by the frame and the seat pan, said links having pivot points that are fixed relative to the frame and seat pan, wherein pivoting of the links leads to the deformation of said quadrilateral so as to place the seat pan in said first tilt angle position; and
locking means (10) for locking the pivoting of the links in relation to the seat pan or the frame,
wherein the set of links includes front links (6) hinged on the frame (3) at a first point and on the seat pan (1) at a second point, and rear links (7) hinged on the frame at a third point and on the seat pan at a fourth point, the distance between the second and fourth points being less than the distance between the first and third points.

2. Automobile vehicle seat comprising:
a backrest (2) installed so as to pivot on a seat pan (1) and arranged to be placed in a table position where the rear wall of the backrest is maintained horizontal more or less parallel to a seat support frame (3) arranged to be attached to the floor (5) of the vehicle,
the seat pan (1) being installed in a tiltable manner on said frame so that the seat pan can be positioned with a first tilt angle where the rear of the seat pan is raised to place the backrest, tilted on the seat pan, in the table position,
the seat pan (1) being connected to the frame (3) by a set of links (6, 7) forming two opposite sides of a deformable quadrilateral (ABCD) the two other sides of which are formed respectively by the frame and the seat pan, said links having pivot points that are fixed relative to the frame and seat pan, wherein pivoting of the links leads to the deformation of said quadrilateral so as to place the seat pan in said first tilt angle position; and
locking means (10) for locking the pivoting of the links in relation to the seat pan or the frame,
wherein the links (6, 7) are arranged so that the seat pan (1) can be placed in one or more relaxation positions, the rear of the seat pan being lowered, the locking means (10) allowing the links to be locked in each of said relaxation positions.

3. Automobile vehicle seat comprising:
a seat pan (1) installed so that the seat pan can tilt on a seat support frame (3) arranged to be attached to the floor (5) of the vehicle; and a backrest (2) installed so as to pivot on the seat pan and tiltable on the seat pan to a stop position, the seat pan being connected to the frame by a set of links (6, 7), hinged on the frame and the seat pan and lockable in tilt angle, said links having pivot points that are fixed relative to the frame and seat pan, the links forming with the frame and the seat pan a deformable quadrilateral (ABCD) such that the seat can be placed in the following positions:

a current utilisation position, in which the backrest (2) is raised and the seat pan (1) is tilted towards the rear in relation to the floor (5) according to a second tilt angle where the rear of the seat pan is lower than the front, and a table function position, in which the rear of the seat pan is raised, the seat pan being tilted towards the front in relation to the floor according to a first tilt angle where a rear wall of the backrest can be maintained in horizontal position, more or less parallel to the floor.

4. The seat in accordance with claim 3, wherein the deformable quadrilateral (ABCD) can be deformed so that the seat can be complementarily placed in one or more relaxation positions in which the backrest is raised and the seat pan is tilted towards the rear in relation to the floor according to one or more tilt angles greater than the second tilt angle.

\* \* \* \* \*